(12) United States Patent
Zirngibl

(10) Patent No.: US 6,266,172 B1
(45) Date of Patent: Jul. 24, 2001

(54) SIGNAL BIT RATE AND PERFORMANCE MEASUREMENT FOR OPTICAL CHANNEL SIGNALS

(75) Inventor: Martin Zirngibl, Middletown, NJ (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 08/965,632

(22) Filed: Nov. 6, 1997

(51) Int. Cl.$^7$ ........................................... H04B 10/06
(52) U.S. Cl. ............................................. 359/189
(58) Field of Search .................... 359/189, 110, 359/188; 375/355, 343; 714/704, 705

(56) References Cited

U.S. PATENT DOCUMENTS

| | | | |
|---|---|---|---|
| 4,238,739 | * 12/1980 | Mosley et al. | 331/12 |
| 4,563,774 | * 1/1986 | Gloge | 455/607 |
| 4,817,154 | * 3/1989 | Hoyer | 381/36 |
| 5,048,060 | * 9/1991 | Arai et al. | 375/106 |
| 5,072,407 | * 12/1991 | Gutz et al. | 364/514 |
| 5,216,529 | * 6/1993 | Paek et al. | 359/29 |
| 5,359,607 | * 10/1994 | Nguyen et al. | 371/5.5 |
| 5,420,827 | * 5/1995 | Feintuch | 367/127 |
| 5,465,405 | * 11/1995 | Baseghi et al. | 455/226.4 |
| 5,631,925 | * 5/1997 | Koenzen | 375/225 |
| 5,654,991 | * 8/1997 | Andren et al. | 375/355 |
| 5,757,850 | * 5/1998 | Takaki et al. | 375/225 |
| 5,870,438 | * 2/1999 | Olafsson | 375/334 |

* cited by examiner

Primary Examiner—Leslie Pascal
Assistant Examiner—Dalzid Singh
(74) Attorney, Agent, or Firm—Ryan, Mason & Lewis, LLP

(57) ABSTRACT

Methods and apparatus for determining channel signal bit rate and measuring channel signal performance in a wavelength division multiplexed (WDM) optical network or other optical communication system. A selected channel signal modulated by a pseudorandom non-return-to-zero (NRZ) data stream is detected in a front-end receiver or photodetector and converted to an electrical signal. An autocorrelator receives the detected channel signal, and generates an autocorrelation function for the corresponding electrical signal, from which the channel signal bit rate can be determined. The autocorrelator separates the electrical signal into a first part and a second part, introduces a delay between the first and second parts, multiplies the first and second parts in a multiplier, and integrates the result of the multiplication over a designated time period to provide the autocorrelation function. The bit rate may be determined by measuring the width of a peak in the autocorrelation function. Once the bit rate is determined, the bit-error rate performance of the channel signal can be measured by setting the delay between the first and second parts of the electrical signal to the corresponding bit period, and counting the number of times the multiplier output voltage falls within a specified range. The autocorrelator may be part of a receiver which uses the determined bit rate to generate a clock for recovering the channel signal data.

25 Claims, 2 Drawing Sheets

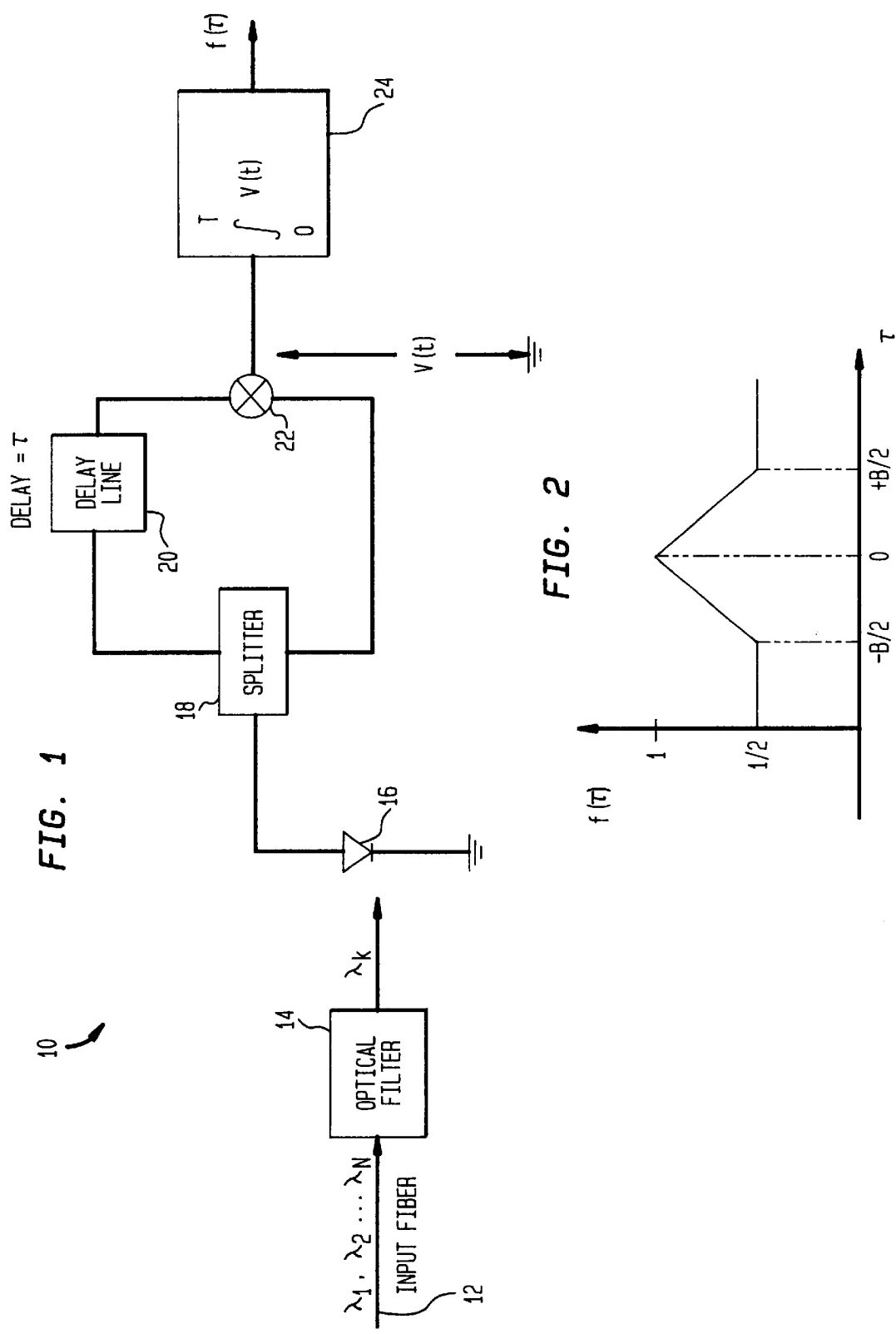

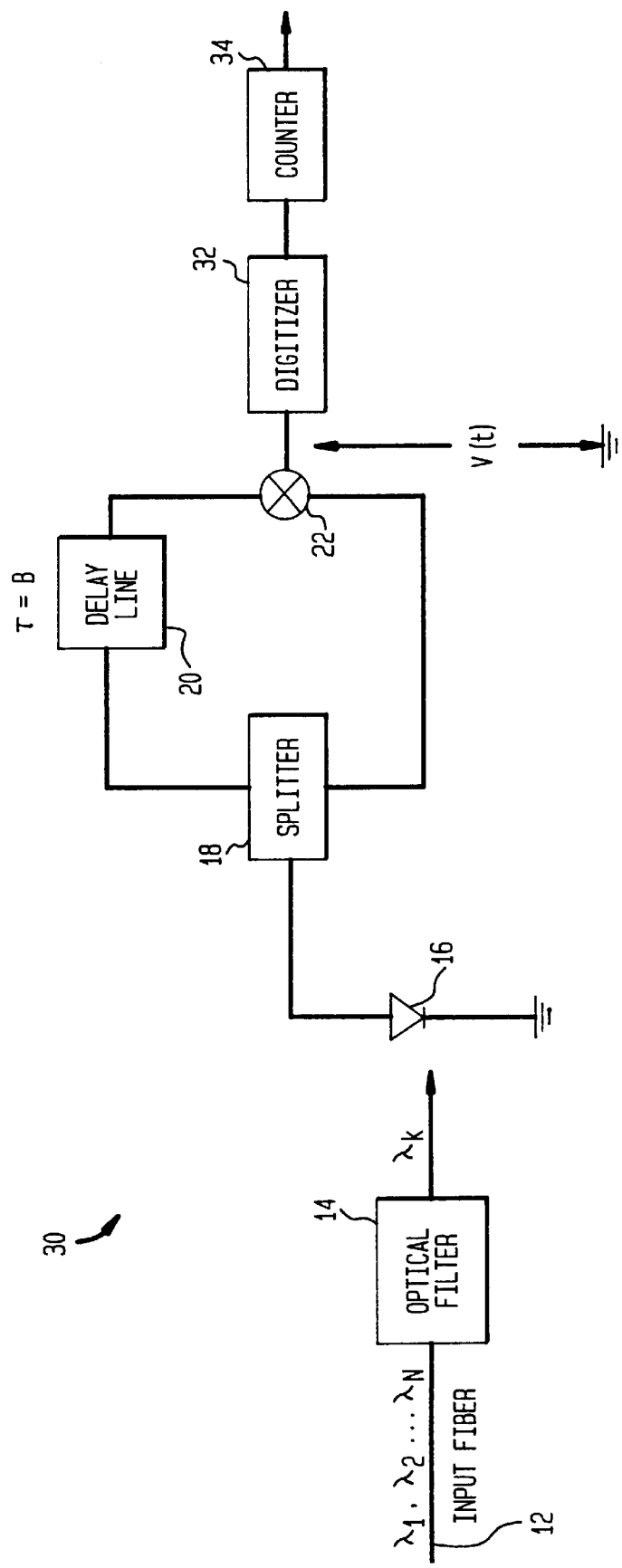

SIGNAL BIT RATE AND PERFORMANCE MEASUREMENT FOR OPTICAL CHANNEL SIGNALS

FIELD OF THE INVENTION

The present invention relates generally to optical communication systems and more particularly to techniques for determining the bit rate and monitoring the performance of a channel signal in an optical system, without requiring complete recovery of the channel signal.

BACKGROUND OF THE INVENTION

A conventional receiver in a multi-channel optical communication system typically includes a clock recovery circuit designed to operate at a particular predetermined bit rate. The receiver is therefore bit-rate specific. Performance monitoring of a given channel signal in the receiver is generally done only after the channel signal data has been completely recovered, and thus after a bit-rate specific clock recovery process. This presents a significant problem in applications such as wavelength division multiplexed (WDM) optical networks in which the transmission medium is generally bit-rate independent. More particularly, the nodes of such a network often do not have any information regarding the bit rate of particular channel signals which are routed through them. As a result, it is generally not possible to monitor the performance of a channel signal at a network node without including the above-noted bit-rate specific receiver circuitry at that node.

Including such bit-rate specific circuitry for each channel signal at each node of a network would substantially increase the cost and complexity of the network, and is therefore not a viable solution for most practical applications. Unfortunately, there are apparently no suitable alternative techniques which may be used to provide a bit-rate independent channel signal monitoring capability in a node of an optical network. A need therefore exists for a device which can identify a channel signal and measure its performance at a node of an optical network, without requiring prior information about the specific signal bit rate, without completely recovering the channel signal data, and thus without the need for bit-rate specific clock recovery circuitry.

SUMMARY OF THE INVENTION

The invention provides methods and apparatus for determining the bit rate of an optical signal and measuring the performance of the optical signal, without any prior information regarding the signal bit rate and without the need for completely recovering the signal data. In an illustrative embodiment, one of several non-return-to-zero (NRZ) modulated channel signals in a multi-channel optical signal is selected using a tunable optical filter. The selected channel signal is then applied to a front-end optical receiver or photodetector which generates a corresponding electrical signal. The electrical signal is processed in an autocorrelator which generates an autocorrelation function of the electrical signal, and the width of a peak in the autocorrelation function provides a measure of the channel signal bit rate. The autocorrelator may include a splitter for separating the electrical signal into first and second parts, a delay line for introducing a delay between the first and second parts, a multiplier for generating the product of the first and second parts, and an integrator for integrating the multiplier output over a suitable time period in order to provide the autocorrelation function. The autocorrelator may be part of an optical receiver which uses the determined bit rate to generate a clock signal for recovering the channel signal data.

In accordance with another aspect of the invention, the performance of the selected channel signal may be measured after the bit rate has been determined in the manner described above. The delay line is set to provide a delay corresponding to the inverse of the determined bit rate, and the output of the multiplier is digitized to provide an indication of voltage level. The voltage levels falling within a specified range corresponding to a desired eye margin are then counted to determine an approximate bit error rate for the channel signal. Unlike performance measures generated using conventional techniques, this performance measure can be generated in a bit-rate independent manner, and therefore without the need for bit-rate specific clock recovery circuitry. As a result, the invention is well suited for implementation in nodes of a WDM optical network and in numerous other important applications.

BRIEF DESCRIPTION OF THE DRAWINGS

FIG. 1 is a schematic diagram of a channel signal bit-rate identifier in accordance with an exemplary embodiment of the invention.

FIG. 2 is a plot illustrating an autocorrelation function generated in the exemplary channel signal bit-rate identifier of FIG. 1 for a channel signal modulated with pseudorandom non-return-to-zero (NRZ) data and having a bit rate of 1/B.

FIG. 3 shows a bit-rate independent channel signal performance measuring device in accordance with another exemplary embodiment of the invention.

DETAILED DESCRIPTION OF THE INVENTION

The present invention will be illustrated below in conjunction with exemplary bit-rate independent channel signal bit-rate identification and performance measurement devices. It should be understood, however, that the invention is more generally applicable to any device or application in which it is desirable to identify, receive, monitor, measure the performance of or otherwise process an optical signal in a bit-rate independent manner. A "channel signal" as the term is used herein is intended to include a signal component of a multi-channel WDM signal as well as a signal component of any other type of multi-channel optical signal. Although particularly well suited for use with channel signals in nodes of WDM networks, the invention may be used to determine the bit rate and/or measure the performance of any modulated optical signal in which the data may be characterized as approximately random with a substantially equal probability of one and zero data levels.

FIG. 1 shows an exemplary channel signal bit-rate identifier 10 in accordance with the invention. The bit-rate identifier 10 receives a multi-channel optical signal on an input optical fiber 12. The multi-channel optical signal on fiber 12 includes a set of N channel signals, each at a different optical wavelength $\lambda_1, \lambda_2 \ldots \lambda_N$. The multi-channel optical signal may be generated by, for example, an integrated N-channel 1550 nm InGaAsP laser which includes an arrayed-waveguide outer, gain sections on each of the N channel ports, and a single common amplifier in the output port. The number of channels N may be on the order of 24 or more. Such a multi-channel optical source is described in greater detail in M. Zirngibl et al., "Demonstration of a 9×200 Mbit/s Wavelength Division Multiplexed Transmitter," Electronics Letters, Vol. 30, p. 1484, 1994, which is incorporated by reference herein. Modulation data for each of the channel signals may be supplied to the multi-channel optical source in the form of a data signal from a corresponding modulation source. Each of the N distinct channel signals of the multi-channel signal on input fiber 12 is generally modulated by a different data signal. It will be assumed for purposes of illustration that each of the channels signals is modulated by a non-return-to-zero (NRZ) data signal, and that the data signal bit rates are unknown in the identifier 10. An NRZ data signal generally has a random structure with an equal average probability of one and zero data levels. As noted above, the invention may also be used with other types of modulation which exhibit a substantially equal probability of one and zero data levels.

The input fiber 12 in the identifier 10 is applied to an optical filter 14, which selects a single one of the N channel signals, such as the channel signal at wavelength $\lambda_k$, for application to a photodetector 16. The optical filter 14 may be a tunable optical filter which can be tuned to select any of the N channel signals, and may be implemented as a portion of an arrayed-waveguide grating router, or another suitable optical routing or filtering device. The photodetector 16 converts the selected optical channel signal into a corresponding electrical signal. The photodetector 16 should have an electrical bandwidth which is greater than the highest expected bit rate of any of the N channel signals. In other embodiments of the invention, the photodetector 16 may be replaced by a front-end optical receiver which provides preamplification of the detected electrical signal. Alternatively, the photodetector 16 may be viewed as an element of such a front-end receiver.

The detected electrical signal is applied to a signal splitter 18 which separates the electrical signal into two parts which may be substantially equal in magnitude. One part is electronically delayed by an amount τ in an electronic delay line 20. The delay τ may be varied until an appropriate value is determined, or may be selected based on information regarding a range of possible bit rate values for the selected channel signal. The other part of the detected electrical signal is applied directly to an input of a multiplier 22 which also receives the delayed part of the electrical signal from the delay line 20. The multiplier 22 multiplies the two parts of the electrical signal, generating an output signal V(t). The signal V(t) is applied to an integrator 24 which averages V(t) over a time period T, where T is sufficiently long to ensure that the lowest bit-rate channel signal will be averaged over many bit periods. The output of the integrator 24 is an autocorrelation function $f(\tau)$ which may be used to determine the bit rate of the selected channel signal.

FIG. 2 illustrates the autocorrelation function $f(\tau)$ generated in the identifier 10 for a channel signal modulated by an NRZ data signal at a bit rate of 1/B. The autocorrelation function $f(\tau)$ can be expressed mathematically as follows:

$$f(\tau) = \frac{1}{T} \int_0^T S(t)S(t-T)dt.$$

From FIG. 2 it can be seen that the autocorrelation function $f(\tau)$ exhibits a peak of width B, where B is the bit period of the NRZ data signal modulating the detected channel signal. A plot or trace of the autocorrelation function $f(\tau)$ as shown in FIG. 2 can therefore be used to determine an otherwise unknown bit rate of a channel signal, by measuring the width of the peak to obtain the bit period B, and computing the bit rate as 1/B. The bit rate information can then be used to generate an appropriate clock signal to allow full recovery of the channel signal. The autocorrelation function $f(\tau)$ of FIG. 2 is shown for the case of infinite modulation depth. In general, the peak and plateau levels in the autocorrelation trace may also be used to estimate the modulation depth of the signal. For example, in the case of infinite modulation depth, the peak level is equal to twice the plateau level, as illustrated in FIG. 2.

FIG. 3 shows a device 30 which utilizes a bit rate determined in the manner described above to provide a measure of the performance of the corresponding channel signal, without requiring full recovery of the channel signal. The ability to provide such a performance measure is important in, for example, optical network applications in which channel signal performance has to be checked at different nodes which may not have the circuitry required to provide full recovery of the channel signal. The device 30 includes input fiber 12, optical filter 14, photodetector 16, signal splitter 18, delay line 20 and multiplier 22, all operating in a manner similar to that previously described in conjunction with FIG. 1. The delay line 20 is configured so as to provide a delay τ which is substantially equivalent to the bit period B determined by measuring the width of the peak in the autocorrelation function in FIG. 2. This provides a delay of one bit period between the two parts of the signal applied to the multiplier 22. The output voltage V(t) of the multiplier 22 is then applied to a digitizer 32 which converts a given voltage level to a corresponding digital value. The digital values are then input to a counter 34. The counter 34 counts the number of output voltage levels falling between specified minimum and maximum levels in order to determine an approximate bit-error rate for the channel signal, without fully recovering the channel signal data.

Assuming that the output voltage V(t) is ac coupled, the output voltage for an uncorrupted signal, normalized to the maximum voltage level, should be approximately as shown in the table below.

| Bit Sequence | Normalized Voltage |
|---|---|
| 11 | 1 |
| 10 | 0 |
| 01 | 0 |
| 00 | 0 |

An approximate measure of eye diagram opening and thus channel signal bit-error rate can be determined by counting the number of voltage levels which fall between ε and 1−ε, where ε is a specified eye margin. For example, a corrupted channel signal will generally produce a large number of intermediate output voltage values which fall between ε and 1−ε. The counter 34 counts the number of output voltage values which fall within this range in order to provide the approximate bit error rate for the channel signal. In optical network applications, an alarm could be generated when a channel signal exhibits a bit error rate which exceeds a pre-set threshold.

It should be emphasized that the bit-rate identifier 10 of FIG. 1 and the performance measurement device 30 of FIG. 3 are configured to illustrate the operation of the present invention, and should not be construed as limiting the invention to use in any particular embodiment or group of embodiments. In a possible alternative configuration, the digitizer 32 and counter 34 of FIG. 3 may be incorporated into the embodiment of FIG. 1, with a switch used to connect the output of multiplier 22 to integrator 24 for measurement of the channel signal bit rate using the autocorrelation function, and to connect the output of multiplier 22 to digitizer 32 for measurement of an approximate bit error rate after the bit rate is known. Various elements of the FIG. 1 and FIG. 3 embodiments, such as integrator 24, digitizer 32 and counter 34, may be implemented using a suitably-programmed microprocessor or other type of data processor. In addition, as previously noted, the photodetector 16 may be part of or replaced by a front-end receiver.

Other embodiments may use other types of measuring or monitoring devices to determine signal bit rate and performance measures using the autocorrelation function. For example, the bit rate and performance measuring processes described above can be implemented using a variety of different types of conventional signal processing hardware and software. Another possible implementation of the invention may be in the form of an optical signal receiver which utilizes the channel signal bit-rate identifier of FIG. 1 as a clock recovery circuit. These and numerous other alternative embodiments within the scope of the following claims will be apparent to those skilled in the art.

What is claimed is:

1. A method of determining the bit rate of an optical signal, comprising the steps of:
   detecting the optical signal to generate a corresponding electrical signal;
   generating an autocorrelation function of the electrical signal; and
   determining the bit rate of the optical signal from the autocorrelation function.

2. The method of claim 1 wherein the optical signal is a selected one of a plurality of channel signals of a multi-channel optical signal, and the method further includes the step of selecting the channel signal in a tunable optical filter.

3. The method of claim 1 wherein the optical signal is modulated by NRZ data.

4. The method of claim 1 wherein the step of generating an autocorrelation function of the electrical signal further includes the steps of:
   separating the electrical signal into a first part and a second part;
   introducing a delay between the first and second parts of the electrical signal;
   multiplying the first and second parts of the electrical signal; and
   integrating the result of the multiplying step over a time period to provide the autocorrelation function.

5. The method of claim 4 wherein the time period is selected such that the result of the multiplying step is integrated over a plurality of bit periods at a lowest expected bit rate.

6. The method of claim 4 further including the step of measuring the performance of the optical signal by:
   introducing a delay between the first part of the electrical signal and the second part of the electrical signal, wherein the delay corresponds to an inverse of the determined bit rate;
   multiplying the first and second parts of the electrical signal; and
   generating a count of a number of times the result of the multiplying step falls within a specified range.

7. The method of claim 6 wherein the range corresponds to an eye margin and the count provides an approximate bit error rate for the optical signal.

8. The method of claim 1 wherein the step of determining the bit rate of the optical signal from the autocorrelation function includes measuring a characteristic of the autocorrelation function.

9. The method of claim 8 wherein characteristic of the autocorrelation function which is measured to determine the bit rate is the width of a peak of the autocorrelation function, wherein the width of the peak corresponds to an inverse of the bit rate.

10. The method of claim 1 further including the step of using the determined bit rate to measure the performance of the optical signal.

11. The method of claim 1 further including the step of utilizing the determined bit rate to generate a clock for recovering the optical signal.

12. An apparatus for determining the bit rate of an optical signal, comprising:
   an optical detector for detecting the optical signal to generate a corresponding electrical signal;
   an autocorrelator having an input coupled to an output of the optical detector, wherein the autocorrelator is operative to generate an autocorrelation function of the electrical signal; and
   a signal processing device operative to determine the bit rate of the optical signal from the autocorrelation function.

13. The apparatus of claim 12 wherein the apparatus further includes a tunable optical filter or selecting the optical signal from one of a plurality of channel signals of a multi-channel optical signal.

14. The apparatus of claim 12 wherein the optical signal is modulated by NRZ data.

15. The apparatus of claim 12 wherein the autocorrelator further includes:
   a splitter having an input coupled to the output of the detector, the splitter separating the electrical signal into a first part and a second part;
   at least one delay line for introducing a delay between the first and second parts of the electrical signal;
   a multiplier having inputs for receiving the first and second parts of the electrical signal, and an output corresponding to a multiplication of the first and second parts of the electrical signal; and
   an integrator having an input coupled to an output of the multiplier, the integrator integrating multiplication of the first and second parts of the electrical signal over a time period to provide the autocorrelation function.

16. The apparatus of claim 15 wherein the time period is selected such that the integrator integrates the multiplication of the first and second parts of the electrical signal over a plurality of bit periods at a lowest expected bit rate.

17. The apparatus of claim 15 wherein the signal processing device further comprises a processor for measuring the performance of the optical signal, wherein the delay introduced between the first and second parts of the signal in the at least one delay line is set to an inverse of the determined bit rate, and the processor is operative to count a number of times the multiplied first and second parts fall within a specified range.

18. The apparatus of claim 17 wherein the range corresponds to an eye margin and the count provides an approximate bit error rate for the optical signal.

19. The apparatus of claim 12 wherein the signal processing device comprises a processor operative to determine the bit rate of the optical signal from the autocorrelation function by measuring a characteristic of the autocorrelation function.

20. The apparatus of claim 19 wherein the processor measures the width of a peak of the autocorrelation function to determine the bit rate, wherein the width of the peak corresponds to an inverse of the bit rate.

21. The apparatus of claim 12 wherein the signal processing device further comprises a processor for measuring the performance of the optical signal.

22. The apparatus of claim 12 wherein the autocorrelator is part of a receiver which uses the determined bit rate to generate a clock for recovering the optical signal.

23. The apparatus of claim 12 wherein the optical detector is part of a front-end optical receiver which provides preamplification for the electrical signal.

24. A method for determining the bit rate of an optical signal, the method comprising the steps of:

generating an autocorrelation function characterizing the optical signal, the autocorrelation function being generated by correlating a first version of a detected signal generated from the optical signal with a second version of the detected signal generated from the optical signal; and determining the bit rate of the optical signal from the autocorrelation function.

25. An apparatus for determining the bit rate of an optical signal, comprising:

an autocorrelator for generating an autocorrelation function characterizing an optical signal, the autocorrelation function being generated by correlating a first version of a detected signal generated from the optical signal with a second version of the detected signal generated from the optical signal; and a signal processing device operative to determine the bit rate of the optical signal from the autocorrelation function.

* * * * *